Jan. 4, 1966  J. W. TAMPLEN  3,227,462
SEAL ASSEMBLIES FOR TUBULAR CONDUCTORS
Filed June 10, 1964  3 Sheets-Sheet 3

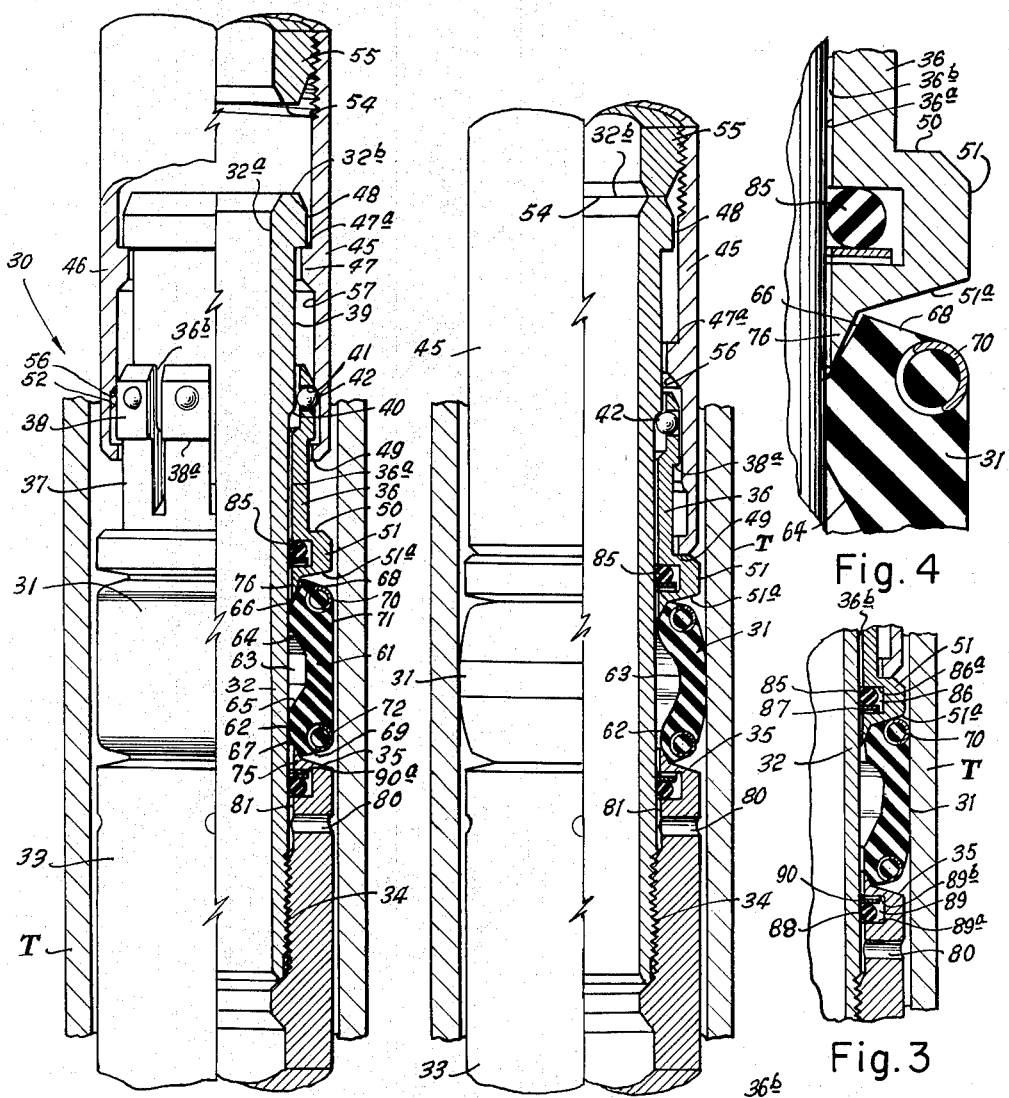

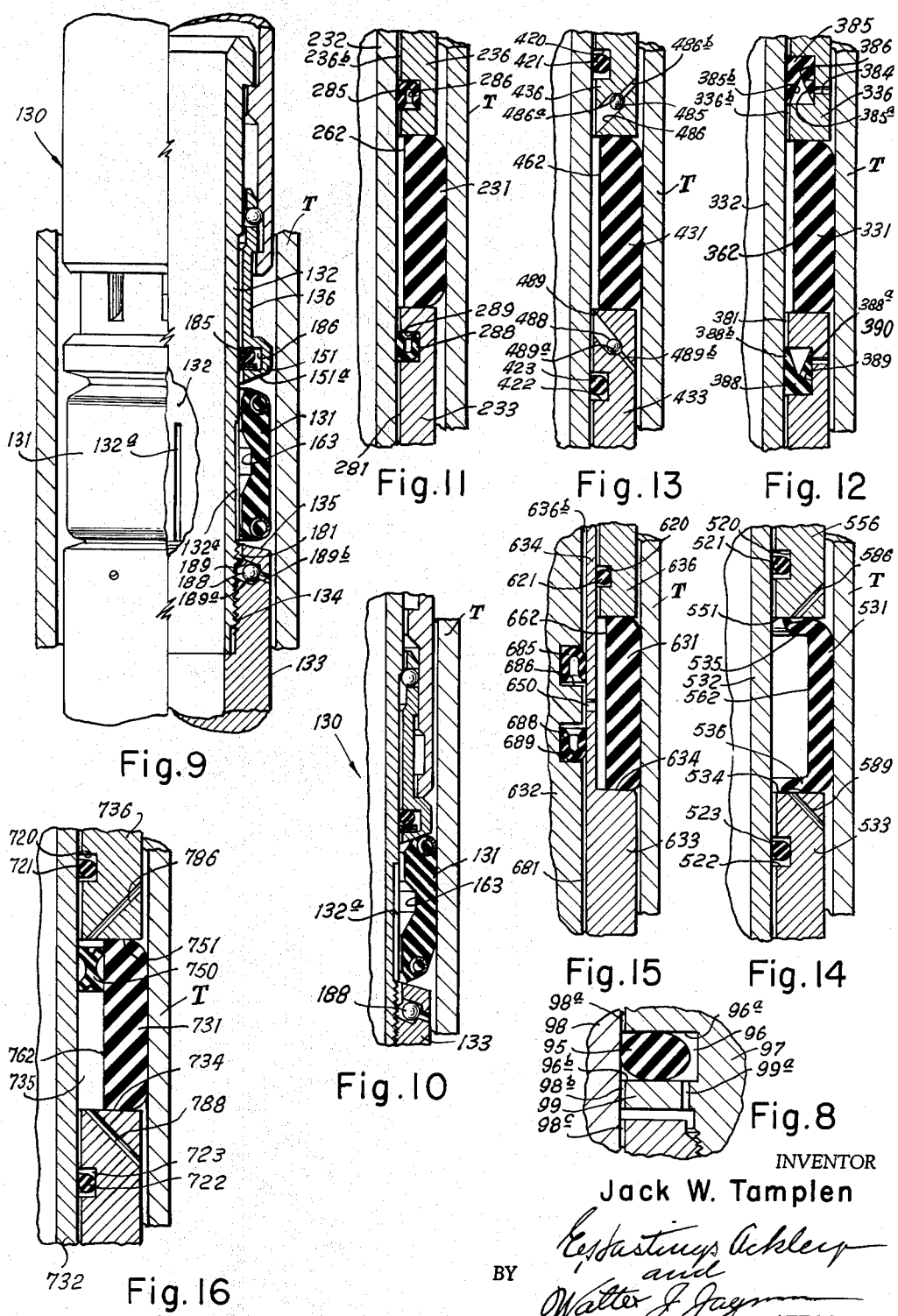

INVENTOR
Jack W. Tamplen
BY
ATTORNEYS

United States Patent Office 3,227,462
Patented Jan. 4, 1966

1

3,227,462
SEAL ASSEMBLIES FOR TUBULAR
CONDUCTORS
Jack W. Tamplen, Celina, Tex., assignor to Otis
Engineering Corporation, Dallas, Tex., a corporation of Delaware
Filed June 10, 1964, Ser. No. 374,046
29 Claims. (Cl. 277—34)

This application is a continuation-in-part of my copending applications, Serial No. 115,812 filed June 8, 1961, for Sealing Devices and Serial No. 229,000 filed October 8, 1962, for Sealing Devices.

This invention relates to new and useful improvements in seals, and more particularly to sealing devices for effecting a fluid tight seal between adjacent surfaces.

One object of this invention is to provide a new and improved sealing device.

An important object of the invention is to provide a new and improved sealing device for sealing the gap between a tubular flow conductor and an object disposed therein wherein the sealing element functions as a cup type seal adapted to seal off flow therepast in either direction.

A further object of the invention is to provide in a sealing device a sealing ring structure which will act to seal against pressure in one direction but which will allow flow therepast in the opposite direction.

A particularly important object of the invention is to provide a sealing device of the character described which includes a sealing element adapted to be mechanically expanded into initial sealing engagement with a well flow conductor for sealing between a well tool on which the sealing element is mounted and the well flow conductor, and which is thereafter adapted to be maintained in sealing position by fluid pressure acting on such sealing element, said sealing element being adapted to seal off flow of fluid and the pressure of the fluid acting in either longitudinal direction of the flow conductor on said sealing element.

Another object of the invention is to provide a form of sealing element which, when being inserted in a well flow conductor on a well tool is retracted relative to the diameter of the flow conductor into which it is being installed, so as to provide substantial clearance between the seal element and the conductor while the well tool is being inserted in the conductor thereby avoiding wear of the seal element and providing adequate bypass passage for well fluids through which the well tool is moved in the flow conductor, and which is adapted to be mechanically moved into initial sealing engagement with the wall of the well flow conductor and to thereafter be maintained in sealing engagement with the wall of the well flow conductor to prevent flow of fluids or escape of fluid pressure therepast in either direction by the pressure of such fluids in the well.

A primary object of the invention is to provide a subsurface well tool embodying an initially retracted packing assembly that is expandable against a wall of the well flow conductor by the application of an external force to such packing element, and in which the packing assembly functions as opposed packings of the cup type to seal against the flow conductor and to prevent fluid flow thereby in both directions under both low and high pressure conditions, and in which relief of the fluid pressure and the external expanding force permits the packing assembly to return automatically to its retracted position for removal from the well flow conductor.

A further object of the invention is to provide in a well tool packing assembly of the character described, a seal ring structure which will permit flow of fluids in one direction therepast but which will seal off the flow of

2 fluids and pressure in the opposite direction, whereby the seal ring is effective to prevent flow of fluids therepast in only one direction.

Additional objects and advantages of the invention will be readily apparent from the reading of the following description of a device constructed in accordance with the invention and reference to the accompanying drawings thereof, wherein:

FIGURE 1 is a fragmentary view, partly in elevation and partly in section, showing a portion of a well tool and a sealing assembly embodying the invention provided on such well tool and disposed in retracted non-sealing position in a well flow conductor;

FIGURE 2 is a view similar to FIGURE 1 showing the sealing assembly in initial expanded sealing position;

FIGURE 3 is a fragmentary, vertical sectional view of the sealing assembly of FIGURE 2 showing the main sealing element with fluid pressure applied thereto in one direction;

FIGURE 4 is an enlarged fragmentary sectional view of a portion of the main sealing element and the mechanical expander therefor shown in FIGURE 1;

FIGURE 5 is an enlarged fragmentary sectional view of a seal ring used in the structure of FIGURE 1 showing the ring in its normal position;

FIGURE 6 is a view similar to FIGURE 5 showing the sealing ring sealing against flow in one direction therepast;

FIGURE 7 is a view similar to FIGURE 5 showing the sealing ring moved to an exaggerated non-sealing position to permit fluid to flow therepast in the direction opposite therepast;

FIGURE 8 is a fragmentary cross-sectional view similar to FIGURE 5 of a modified form of sealing ring structure;

FIGURE 9 is a view similar to FIGURE 1 of a modified form of sealing assembly showing the assembly in retracted position in a well flow conductor;

FIGURE 10 is a view of the sealing assembly of FIGURE 9 showing the main sealing element thereof in expanded sealing position;

FIGURES 11, 12, 13, 14, 15 and 16 are modified forms of sealing assemblies;

Figures 22, 23:
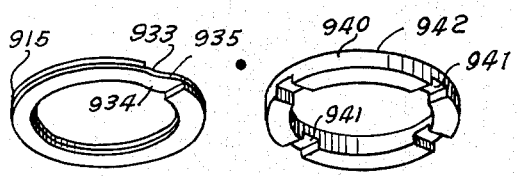
FIGURE 22 is a perspective view of a spacer ring for use in the device in FIGURE 21.
FIGURE 23 is an isometric view of a modified form of spacer ring for permitting flow of fluids past the seal rings of FIGURES 20 and 22.

Referring now to the drawings, particularly to FIGURES 1 through 4 thereof, a device having a sealing assembly 30 embodying the invention is shown disposed within a well conductor, such as a well tubing string. The sealing device includes an elastic, resilient sealing element 31 which is annular in form and slidably mounted upon and about an elongate tubular mandrel 32 having a bore 32a. A lower sub 33 is attached as by threads 34, to the lower end of the mandrel and the upwardly facing upper end 35 of the sub supports the sealing element 31 and limits downward displacement thereon on the mandrel.

A cylindrical expander 36, having an internal bore 36a is slidably mounted on the tubular mandrel above the sealing element and is adapted to be moved downwardly on the mandrel into engagement with the sealing element to compress and mechanically expand the sealing element into initial sealing engagement with the bore wall of the well tubing T. The expander is formed with a plurality of upwardly extending fingers 37 having external bosses 38 at their upper free ends. The mandrel 32 has an enlarged exterior upper portion 39 which provides an inwardly and downwardly extending external annular shoulder 40 intermediate the ends of the mandrel, and the upper portion of the bore 36a of the expander is enlarged at its upper portion so that the upper ends of the fingers are adapted to telescope over the lower portion of the enlarged portion 39 of the mandrel, as clearly shown in FIGURE 1. The bosses 38 of the finger 37 are each provided with an aperture 41 extending transversely therethrough and in which a ball 42 is disposed for radial movement therein relative to the expander. When the expander is slidably positioned on the mandrel with the apertures of the fingers and the balls carried therein adjacent the enlarged mandrel portion 39, the balls 42 project outwardly of the bosses of the expander fingers and are held in such expanded or projected positions by the external surface of the enlarged portion of the mandrel.

A locking sleeve 45 is telescoped on the mandrel 32 and has its lower portion 46 telescoped also about the upper end of the expander 36. The locking sleeve is provided intermediate its ends with an internal annular flange 47 which provides an upwardly facing shoulder 47a adapted to engage an external annular flange 48 on the upper end of the mandrel, whereby upward movement of the locking sleeve relative to the mandrel is limited by the engagement of the upwardly facing shoulder 47a with the external annular flange 48 of the mandrel. Downward movement of the locking sleeve relative to the expander 36 is limited by engagement of the lower end 49 of the locking sleeve with the upwardly facing shoulder 50 formed on the upper end of an external annular flange 51 provided on the lower portion of the expander sleeve. An internal annular recess 52 is formed in the lower portion of the bore of the locking sleeve, and the balls 42 are adapted to be received in the groove 52 when the balls are in the projecting position shown in FIGURE 1, when the locking sleeve is in uppermost position relative to the mandrel. The expander is in its upper position supported on the mandrel by the engagement of an internal annular flange 53 which projects inwardly of the bore of the locking sleeve and is disposed beneath the shoulders 38a in the lower end of the bosses 38 on the fingers 37 of the expander sleeve. The fingers will spring inwardly to permit the bosses to pass into the bore of the locking sleeve and be disposed about the inwardly projecting shoulder 53. Downward movement of the locking sleeve with respect to the mandrel 32 is limited by the engagement of the upper end 32b of the mandrel with the lower end 54 of an upper sub 55 which is threaded into the upper portion of the locking sleeve, as shown in FIGURE 2.

When the locking sleeve is in its uppermost position relative to the mandrel, as shown in FIGURE 1, the expander sleeve 36 is supported on the locking sleeve by the engagement of the shoulders 38a of the bosses 38 with the internal annular flange 53 at the lower end of the bore of the locking sleeve. The outwardly projecting portions of the balls 42 which are now held in expanded positions by the enlarged portions 39 of the mandrel are received in the internal annular recess 52 in the bore of the locking sleeve above the flange 53. The balls engage the inner wall of the locking sleeve within the recess and abut an inwardly and upwardly inclined shoulder 56 in the bore of the locking sleeve at the upper end of the recess 52. The balls thus prevent the locking sleeve from moving downwardly relative to the expander, and the engagement of the upwardly facing shoulder of the flange 53 with the shoulders 38a of the bosses 38 of the expanders fingers prevents the locking sleeve from moving upwardly relative to the expander. Thus, it is apparent that the locking sleeve and the expander element 36 are locked together against longitudinal movement relative to one another as long as the surface of the enlarged portion 39 of the mandrel engages the balls 36 to hold the same outwardly in the expanded position.

A conventional wireline running and pulling tool, such as the running and pulling tool disclosed in U.S. Patent No. 2,348,563, to H. C. Otis, may be connected with the upper sub 55 and used to force the locking sleeve downwardly relative to the mandrel when it is desired to expand the sealing element. Of course, other suitable means for moving the locking sleeve may also be employed.

As the locking sleeve is moved from its uppermost position, shown in FIGURE 1, to its lowermost position, shown in FIGURE 2, the engagement of the downwardly facing internal shoulder 56 in the recess 52 with the balls 42 also causes the expander to move downwardly therein, since the balls confined within the apertures 41 of the expander fingers transmit the downward force exerted by the locking sleeve on the balls to the expander element. During such downward movement of the expander, the surface 51a thereof below the external annular flange 51 engages the upper end of the sealing cup 31, in a manner which will hereinafter be more fully explained, to mechanically compress the sealing element against the upper end portion 35 of the lower sub 33, thus causing the sealing element to expand radially outwardly.

As soon as the expander 36 has been moved downwardly a sufficient distance to cause the balls 42 to move below the downwardly facing shoulder 40 of the mandrel and out of engagement with the surface 39 of the mandrel, the balls are cammed inwardly by the annular inclined shoulder 56 of the locking sleeve and move out of the recess 52 of the locking sleeve. This inward movement of the balls disengages the balls from the shoulder 56 and frees the locking sleeve for downward movement relative to the expander element. The internal surface of the bore 57 of the locking sleeve above the shoulder 56 now holds the balls inwardly in engagement with the outer surface of the mandrel below the shoulder 40, and the engagement of the balls with the shoulder 40 of the mandrel locks the expander element against upward displacement relative to the mandrel. In this position, with the balls 42 abutting the downwardly facing shoulder 40 of the mandrel, the expander element is locked in its lower position on the mandrel against upward movement away from the position in which the expander element compresses the sealing element 31 mechanically into initial sealing engagement with the bore wall of the well tubing T as shown in FIGURE 2.

It will thus be seen that the sealing element, when compressed by the expander element, it is only compressed to a degree determined by the limit of downward movement of the expander element. The lowermost positions of the expander elements and the locking sleeve are thus designed to permit compression of the sealing element to a predetermined degree which is sufficient to cause the sealing element to engage the inner wall of the tubing string and to effect a mechanical initial fluid tight seal between the mandrel and the tubing, but will not result in overstress or overcompression of the sealing element.

It will further be seen that the expander element can not be moved upwardly to permit relaxation of the sealing element until the locking sleeve is lifted sufficiently to aline the internal recess 52 therein with the balls 42 to allow the balls to move out of engagement with the downwardly facing shoulder 40 of the mandrel and thus permit upward movement of the expander on the mandrel.

The main sealing element 31 which is adapted to seal between the mandrel and the tubing is formed of rubber, synthetic rubber or other suitable resilient material and is formed with an outside diameter such that the element will pass readily through the bore of the tubing string with ample clearance. As is clearly shown in FIGURE 1, the sealing element is formed with substantially a tubular cylindrical shaped body 61 having a bore 62 which is enlarged in its midportion by an internal annular recess 63 having divergently inwardly convergent upper and lower surfaces 64 and 65, respectively. The upper end of the bore of the sealing element is flared outwardly as at 66 and the lower end of the bore is likewise flared outwardly as at 67 for a purpose which will hereinafter be more fully explained. The outer portions of the ends of the sealing element are convergently inclined downwardly and outwardly as shown at 68 and 69 for a purpose which will also be more fully explained hereinafter, and an anti-extrusion element or member 70 is molded into the body of the sealing element adjacent the point of convergence of the outwardly and downwardly inclined upper end 68 and the outer surface 71 of such sealing element as is clearly shown in FIGURE 1, and a similar anti-extrusion element or member 72 is molded into the body of the sealing element at the point of convergence of the lower upwardly and inwardly inclined surface 69 and the outer surface 71 of the sealing element. The anti-extrusion elements 70 and 72 are preferably made in the form of close coiled tension garter springs and are preferably molded into the sealing element at the time the sealing element is formed, and are adapted to prevent extrusion of the sealing element in a manner to be hereinafter more fully explained.

The upper end 35 of the lower sub 33 is inclined upwardly and inwardly as is clearly shown in FIGURE 1 and an upwardly extending annular frusto conical wedging extension 75 is formed on the inner side of the upper end of the subs and is arranged to be disposed within the downwardly and outwardly inclined lower surface or portion 67 of the bore of the sealing element, as is also shown in FIGURE 1. Similarly, the lower surface 51a of the expander member 36 is inclined inwardly and downwardly and is provided with an annular frusto-conical depending wedging surface 76 which is adapted to engage within the upwardly and outwardly flared upper surface or portion 66 of the bore of the sealing element 31. Since the outer diameter of the sealing element formed by the outer surface 71 thereof is preferably no greater than the diameter of the lower sub 33 and of the flange 51 on the expander element, it will be seen that the sealing element will pass readily through the tubing with the remainder of the tool and without fluid pressure acting thereon. Also, since the length of the sealing element is slightly less than the distance between the lower surface or end 51a of the expander element and the upper shoulder or surface 35 of the lower sub, it will be seen that the sealing element may remain in its retracted normal relaxed position on the mandrel 32 between the expander element and the lower sub during the time the tool is being lowered into the well tubing or being moved therein.

When the device has been lowered to a desired position within the well flow conductor, the locking sleeve 45 is moved downwardly in the manner already described to move the expander element 36 downwardly therewith toward the lower sub 33. As the expander element moves downwardly, the lower surface 51a thereof engages the upper end of the main sealing element 31 and moves the element downwardly toward the upper end surface 35 of the lower sub. When the expander element has been moved to its lowermost position, shown in FIGURE 2, the sealing element 31 is longitudinally compressed and the central portion thereof is deformed outwardly into engagement with the wall of the well tubing T. The central recess 63 formed in the bore of the sealing element 31 provides a thiner wall section or portion in the medial portion of the sleeve which will flex more readily than the remainder of the sleeve, and hence the sleeve will flex outwardly into the initial sealing engagement with the tubing as is shown.

Since the flared inner upper end surface 66 of the sealing element 31 is engaged by the frusto-conical wedge surface 76 of the expander member and since the lower outwardly flared surface 67 at the lower end of the bore of the sealing element is engaged by the upwardly projecting wedge 75 of the lower sub, it will be seen that the sealing element is held against inward compression against the outer surface of the mandrel 32 by such wedge members and that fluid pressure from either above or below the sealing element may pass downwardly or upwardly and into the bore of the sealing element. As shown in FIGURES 2 and 3, the pressure from below the sealing element enters from a lateral port 80 formed in the wall of the lower sub 33 above the threads 34 and passes upwardly through an annular space 81 between said sub and the mandrel 32 and past the frusto-conical members 75 into the bore of the enlarged portion 63 of the bore of the sealing element. The fluid pressure then tends to move the sealing element outwardly into the position shown in FIGURE 3 wherein the upper anti-extrusion ring 70 is disposed in abutting engagement with the bore wall of the tubing string T and with the outer portion of the inclined lower surface 51a of the flange 51 of the expander element, whereby the fluid pressure cannot pass outwardly from within the sealing element into the annular space exteriorly of the expander element. The upward and outward inclination of the surface 51a also tends to cause the anti-extrusion element to move outwardly toward the tubing wall.

For preventing fluid pressure from passing upwardly within the expander element between the expander element and the mandrel 32, an O-ring type sealing element or ring 85 is disposed in an internal annular groove 86 formed in the bore of the flange portion 51 of the expander element and is adapted to seal between the upper shoulder 86a of such recess and the exterior surface of the mandrel, as clearly shown in FIGURES 3 and 6. The O-ring sealing ring will therefore prevent fluid pressure from below the sealing element 31 from passing upwardly out of the element 31 past the expander member 36, and the fluid pressure will be trapped below the expander member and within the sealing element.

While the sealing element 85 is moved upwardly by fluid pressure from the annular space between the expander member 36 and the mandrel into sealing engagement with the upper surface 86a of the recess and the exterior surface of the mandrel 32, downward flow of fluids from the annular space 36b between the bore 36a of the expander member 36 and the exterior of the mandrel 32 may take place because of the provision of an annular spacer ring 87 disposed in the recess 86 below the O-ring 85 and resting on the upwardly facing shoulder or surface 86b at the bottom of the recess. The spacer ring 87 has a plurality of laterally extending or radially extending flow passages 87a formed in its lower surface resting on the surface 86b whereby the pressure of fluids flowing downwardly through the annular space 86b and acting on the O-ring 85 will tend to force the O-ring 85 outwardly in the recess 86 to the position shown in exaggerated form in FIGURE 7 wherein the O-ring is spaced from the exterior surface of the mandrel 32 and fluids may flow downwardly between the O-ring in the annular space 36b between the expander element and the mandrel. The openings or passages 87a and the ring 87 prevent trapping of fluid pressure between the O-ring and the lower surface 86b of the recess and permit the O- ring to move outwardly of the recess 86 toward the position shown in exaggerated form in FIGURE 7 whereby fluids may readily flow downwardly past the upper O-ring 85 into the bore of the sealing element therebelow. However, fluids from below the sealing element 85 are prevented from flowing upwardly through the annular space 36b past the O-ring 35, since the O-ring will engage the upper surface 86a of the recess and the exterior surface of the mandrel 32 as shown in FIGURE 6 to prevent fluid flow therepast. The passages 87a permit fluid pressure to enter the chamber 86 outwardly of the O-ring and act on the outer surface of the O-ring to force the O-ring into the sealing position shown in FIGURE 6.

Rings similar to the ring 87 are shown in FIGURES 22 and 23, though the ring may be of other forms.

An O-ring sealing ring or element 88 similar to the O-ring sealing ring 85 is disposed in an internal annular recess 89 similar to the recess 86 formed in the upper end of the lower sub 33 between the inlet port 80 and the upper end surface 35 of the sub, as is shown in FIGURES 1 through 3. The lower sealing shoulder 89a of the recess will be engaged by the O-ring sealing element 88 to prevent downward flow of fluids from within the main sealing element 31 through the annular space 81 between the mandrel and the upper end of the lower sub and thence outwardly through the port 80. However, an annular spacer ring 90 having radial passages 90a in its upper surface, which is similar in all respect to the spacer ring 87 disposed in the upper recess 86 below the upper O-ring 85 and having a radial flow passage 87a formed therein, but is disposed above the O-ring 88, will permit the fluid pressure of the fluids flowing inwardly through the port 80 and upwardly through the annular space 81 toward the interior of the sealing element 31 to pass such O-ring, the O-ring being moved outwardly of the recess 89, away from the mandrel 32 to permit the fluids to pass. The spacer ring 90 and the passages 90a formed therein prevent the O-ring from sealing against the upper surface 89b of the recess 89 in the same manner as the ring 87 prevents the O-ring 85 from sealing against the lower surface 86b of the recess 86.

Obviously, from the foregoing, it will readily be seen that, fluid pressure from below the main sealing element 31 may pass upwardly and inwardly through the annular space 81 past the O-ring 88 and into the enlarged portion 63 of the bore of the main sealing element, where it will act on the sealing element to force the same outwardly toward the position shown in FIGURE 3 wherein the anti-extrusion member 70 is engaged with the upper outer portion of the lower inclined surface 51 of the expander member and the bore wall of the tubing string and the sealing element is held against extrusion upwardly through the annular space between the flange 51 of the expander element and the bore wall of the tubing string. The fluid pressure within the chamber from below will pass upwardly through the lower portion of the annular passage 36b and into the recess 86 to force the O-ring sealing ring 85 into sealing engagement with the downwardly facing surface 86a and the mandrel 32 to prevent fluid pressure from escaping upwardly through the annular passage 36b past the O-ring 85. Therefore, the fluid pressure from below the device further expands the main sealing element 31 into tight pressure set sealing engagement between the mandrel and the tubing string T to prevent upward flow of fluids past the sealing element.

If, however, the fluid pressure above the main sealing element should be greater than that below, the fluids under pressure from above will flow downwardly through the annular passage 36b between the expander member 36 and the mandrel 32, past the O-ring 85 and into the enlarged portion 63 of the bore of the sealing element 31 to deform the lower portion of the sealing element outwardly until the anti-extrusion member 72 engages the lower outer portion of the upper surface 35 of the lower sub 33 and the bore wall of the tubing string T to prevent further outer displacement of the sealing element. The main sealing element will then seal tightly between the surface 35 and the tubing bore wall. The fluid under pressure will then move downwardly through the upper portion of the annular space 81 into the annular recess 89 where it will act on the lower O-ring 88 to cause the same to be deformed in sealing engagement with the lower surface 89a of the recess 89 and the exterior of the mandrel 32 to prevent further flow of the fluid under pressure through the passage 81 and trap the fluid under pressure above the O-ring 88. Thus, the main sealing element is further firmly pressure expanded into tight sealing engagement between the mandrel and the bore wall of the tubing and the fluid pressure above the sealing element is trapped thereabove and cannot pass downwardly therepast.

Thus, it will be seen that the sealing element is mechanically expanded into initial slight sealing engagement with the bore wall of the tubing by the downward movement of the expander member 36 from the position shown in FIGURE 1 to the position shown in FIGURE 2. Thereafter, fluid pressure from below the sealing element trying to move upwardly therepast or fluid pressure from above the mail sealing element 31 trying to move downwardly therepast will enter the bore of the main sealing element in the manner just described and will further deflect or deform the sealing element into tight pressure expanded sealing engagement between the mandrel and the bore of the tubing string T.

A slightly modified manner of mounting the O-rings 85 and 88 in the members in which they are disposed is shown in FIGURE 8, wherein an O-ring sealing ring 95 is mounted in an internal annular recess 96 formed in an outer member 97 and is adapted to seal between the upper surface 96a of the recess and an inner member 98. The lower surface 96b of the recess is provided by an internal annular flange 99 defining the lower limit of the recess 96, and a flow port 99a is drilled in the flange adjacent the outer portion of the recess whereby fluid pressure entering in the annular space 98a between the inner member 98 and the outer member 97 will pass between the O-ring and the outer wall of the recess 96 to the port 99a to equalize pressures on opposite sides of the O-ring 95, and will thus permit the O-ring to be moved outwardly of the recess similarly to the position of the O-ring 85 shown in FIGURE 7, whereby fluid pressure from the passage 98a may flow downwardly past the O-ring 95 and to the passage 98b below the O-ring and thence on downwardly therebelow. However, fluid pressure passing upwardly through the passage 98c will enter through the port 99a into the annular recess 96 behind the O-ring 95 and move the same inwardly toward the inner member 98 and the surface 96a to seal therebetween and to close off flow of fluids upwardly through the passage 98a between the inner member and the outer member in the same fashion as the O-rings of the form first described. This structure substitutes the integral flange 99 and the port 99a for the ring 87 and the radial passage 87a formed therein.

When it is desired to remove the well device having the sealing assembly of FIGURES 1 through 4 thereon from within the well flow conductor, the pressures above and below the main sealing element 31 are preferably equalized by introduction of fluid pressure to the low pressure side of the sealing element by suitable equalizing tools (not shown). While, if the pressures are not large, the seal may be broken without equalizing pressures, but it is preferable that the pressures above and below the sealing element be equalized before the main sealing element is released from sealing position.

In order to release the main sealing element, the locking sleeve 45 is moved upwardly until the internal annular recess 52 is disposed in lateral alignment with the balls 42 to permit the balls to move outwardly into the recess. The inclined surface 40 on the exterior of the mandrel will cam the balls outwardly into the recess 52 and permit the balls to move upwardly along such inclined surface 40 to the enlarged exterior surface 39 of the mandrel. As the locking sleeve is moved upwardly, the internal annular flange 53 at the lower end thereof will engage the shoulders 38a at the lower ends of the bosses 38 of the fingers 37 of the expander member and will lift the expander member upwardly relative to the mandrel. Such upward movement of the locking sleeve and the expander member carried thereby will continue until the internal annular flange 47 having the upwardly facing shoulder 47a intermediate the ends of the locking sleeve engages the lower end of the external annular flange 48 on the mandrel. Continued upward movement of the locking sleeve will then lift the mandrel upwardly to remove the well tool from within the tubing.

As the expander member 36 is moved upwardly away from the lower sub 33, it will be seen that the lower surface 51a of the flange 51 of the expander member is moved upwardly relative to the upwardly facing shoulder or surface 35 at the upper end of the lower sub. This permits the resilient, pliable sealing element 31 to be biased inwardly due to its natural or inherent contractible character. The anti-extrusion members 70 and 72 likewise tend to move the end portions of the sealing elements inwardly since they are formed of closely coiled helical coil springs and will tend to pull those end portions of the sealing elements inwardly. Furthermore, as the expander member is moved upwardly, fluid pressure from within the element may flow outwardly between the outwardly inclined surfaces 66 and 67 at the opposite ends of the bore of the sleeve and the wedge frusto-conical wedge members 75 and 76 on the lower sub and the expander member, respectively. Also, since the distance between the lower surface 51a of the expander member and the upper surface 35 of the lower sub 33 when in their fully spaced positions, is slightly greater than the length of the main sealing element, it is readily apparent that pressure previously trapped within the bore of the main sealing element may readily escape when the expander member is moved to its uppermost spaced position relative to the lower sub. Since the pressures on opposite sides of the main sealing element are now substantially equalized, the element moves inwardly due to its inherent elastic character and returns to its relaxed undistorted position shown in FIGURE 1. The fluid pressures in the well conductor now will pass along the annular space exteriorly of the outer surface 71 of the sealing element and place the bore of the tubing above the sealing element and above the sealing element in communication with each other to fully equalize the pressure on the sealing element and permit the same to fully retract and to be readily removed from the bore of the well tubing or flow conductor.

A slightly modified form of the sealing assembly is shown in FIGURES 9 and 10, wherein the sealing assembly 130 includes a mandrel 132 threaded into a lower sub 133 as shown at 134. A main sealing element 131, which is preferably identical in all respects with the sealing element 31 previously described, is mounted on the exterior of the mandrel 132 between the upwardly and inwardly inclined surface of the upper end 135 of the lower sub 133 and the inwardly and downwardly inclined lower surface 151a on the lower end of the flange 151 of an expander member 136 slidable on the upper portion of the mandrel. A plurality of longitudinally extending slots or grooves 132a are formed in the outer surface of the mandrel 132 at radially spaced points therearound and extend upwardly from a point substantially below the upper surface 135 of the lower sub 133 and upwardly to a point below the upper end of the main sealing element 131 mounted on the mandrel. These slots communicate with an internal annular recess 181 formed in the upper portion of the bore of the lower sub 133 and provide for conducting fluid pressure from the annular recess 181 upwardly interiorly of the main sealing element to the enlarged portion 163 of the bore of the sealing element.

A plurality of outwardly and downwardly inclined lateral ports 189 are formed in the wall of the upper portion of the lower sub 133, and the outer portion 189b of such ports is reduced in diameter to form an inwardly facing annular seat 189a intermediate the ends of the ports upon which a spherical closure element 188, which may be a ball formed of nylon or other suitable material, is adapted to seat to prevent downward and outward flow from the annular recess 181 outwardly through the ports 189 to the exterior of the lower sub 133. However, fluid pressure from exteriorly of the lower sub may flow inwardly through the reduced portion 189b of the port past the ball 188, inwardly through the port 189 in the annular recess 181 and thence upwardly through the longitudinally extending grooves or slots 132a into the enlarged bore 163 of the sealing element for expanding the sealing element as shown in FIGURE 10 by fluid pressure in the same manner as the sealing element 31 of the form of the invention first described was expanded.

The lower surface 151a of the expander element of this form of device is not provided with the frusto-conical wedge member 76 nor is the upper surface 135 of the lower sub provided with the wedged surface 75 of the form first described. Instead, the upper surface 135 of the lower sub extends on inwardly in an uninterrupted upwardly and inwardly inclined direction and the lower surface 151a of the expander element extends inwardly and downwardly in an uninterrupted fashion, as shown in FIGURE 9. The upper end of the main sealing element will be engaged by the lower surface 151a of the expander element and the lower end of the sealing element will be engaged by the upper surface 135 of the lower sub to flex the weaker central wall portion of the main sealing element defined by the recess 163 therein outwardly into mechanically set initial sealing engagement with the wall of the tubing string, and fluid pressure from above or below the sealing element may then enter the bore of the sealing element to further pressure set the sealing element into tight sealing engagement with the tubing string to prevent flow of fluids past the sealing element.

The O-ring sealing element 185 in the recess 186 in the flange 151 of the expander member functions in the same manner as the O-ring 85 of the form first described and prevents upward flow of fluids therepast, but permits downward flow therepast into the bore of the main sealing element. The plurality of nylon balls 188 disposed in the ports 189 formed in the upper end of the lower sub 133 permit inward flow of fluids from below the main sealing element but prevent outward flow from above the sealing element and thus cause the sealing element to function in the same fashion as the form first described. Other elements of the sealing assembly and well tool are of the same as those first described and function in the same manner.

Further modifications of the sealing assembly are shown in FIGURES 11 through 16, and each functions in substantially the same manner as the forms of the invention previously described.

In FIGURE 11, the sealing element 231 is disposed between a lower member 233 and an upper member 236, and may be mechanically expanded to initial sealing engagement with the bore wall of the flow conductor T by longitudinal relative movement between the upper member and the lower member. Fluid pressure may pass downwardly in the annular space 236b between the upper member 236 and the mandrel 232 past a U-shaped annular sealing ring 285 into the bore 262 of the sealing element 231 to force the sealing element further outwardly into tight fluid pressure expanded sealing engagement with the well tubing string T after the sealing element has been deformed initially by relative longitudinal movement of the members 233 and 236 toward each other. Fluid pressure from above is prevented from escaping downwardly through the annular space 281 between the mandrel 232 and the lower member 233 by an upwardly facing U-shaped sealing ring or element 288 disposed in an internal annular recess 289 formed in the upper portion of the lower element 233. However, the lower seal ring 288 will permit pressure from below the assembly to move upwardly through the annular space 281 between the lower member and the mandrel past the seal ring 288 into the bore 262 of the main sealing element 231 until the pressure encounters the upper seal ring 285 which prevents the pressure from escaping on upwardly through the annular space 236b and traps the pressure therebelow.

A further slightly modified form of the invention is shown in FIGURE 12 wherein an upper V-shaped sealing element 385 and a lower V-shaped sealing element 388, having a slightly different configuration from the elements 285 and 288 of the form of FIGURE 11, are disposed in annular recesses 386 and 289, respectively, in the upper member 336 and the lower member 333. The sealing ring 385 has sealing contact with the outer wall of the mandrel 332, and the sealing element 388 likewise has a sealing engagement with the exterior wall of the mandrel. A lateral inlet port 384 extends from the exterior of the upper member 336 inwardly into the annular recess 386 adjacent the lower end of the outer lip 385a of the V-shaped sealing element 385 whereby pressure of fluids from exteriorly of the upper member may flow inwardly through the port 384 past the sealing lip 385a and will be directed downwardly through the annular space 336b into the bore of the sealing element 331 to further expand the sealing element into tight sealing engagement with the wall of the tubing T. The inner lip 385b of the sealing ring 385 prevents the fluid entering through the port 384 from going upwardly past the sealing ring and directs all fluid pressure inwardly and downwardly into the bore of the sealing element 331 as just described. A lateral port 390 formed in the wall of the lower element 333 extends from the exterior of such element inwardly into the annular recess 389 at a point adjacent the upper end of the outer upwardly extending lip 388a of the lower sealing ring 388 and such lip may be deflected away from the wall by fluids entering the annular recess through the port 390 to permit such fluids to flow upwardly into the annular passage 381 and into the bore 362 of the sealing element 331 where such fluids will act to further expand the sealing element into tight sealing engagement with the tubing. The inner upwardly extending lip 388b of the sealing element 388 prevents such fluid pressure from flowing downwardly past the sealing ring and directs all fluid entering through the port 390 upwardly into the bore of the sealing element 331. This sealing assembly therefore functions in substantially the same manner as the assembly first described.

In FIGURE 13 a further modification of the sealing assembly is shown wherein the sealing element 431 is mounted between an upper member 436 and a lower member 433 which are movable longitudinally relative to each other to mechanically compress the sealing element into initial sealing engagement with the inner bore wall of the tubing T in the same manner as is hereinbefore explained. An upper internal annular recess 420 is formed in the upper member 436 and an O-ring 421 is mounted therein and seals between the upper member and the mandrel 432, and a lower internal annular recess 422 having an annular O-ring sealing member 423 mounted therein is formed in the lower member 433 and the O-ring seals in each direction between the lower member and the mandrel 432. An inwardly and downwardly inclined port 486 is formed in the upper member 436 below the O-ring 421 and the outer portion of the port is reduced in diameter as shown in 486b whereby a spherical ball or closure member 485 formed of nylon or the like may engage the seal 486a formed at the reduced portion 486b of the port. Thus, fluid under pressure may flow inwardly through the reduced port 486b past the ball 485, through the port 486 and into the bore 462 of the seal element 431 to further pressure expand the same into tight sealing engagement with the tubing T. The O-rings 421 and 423 prevent escape of the fluid pressure from within the bore of the sealing element. A lower port 489 having a reduced outer portion 489b forming a seat 489a therebetween is formed in the lower member 433 above the O-ring 423 and a ball or spherical closure member 488 is mounted in the port 489 and engages the seat 489a to prevent outward flow of fluids through the port but permit inward flow from exteriorly the lower member 433 through the smaller portion 489b of the port, past the ball 488 and through the port 489 into the bore 462 of the sealing element. The upper ball 485 prevents escape of the fluids from below whereby the fluid pressure acts to expand the sealing element into tight sealing engagement with the tubing. Similarly, the pressure from above passing the ball 485 is prevented from escaping from the bore of the sealing element by the lower ball 488 engaging the seat 489a. This form of sealing assembly thus operates in substantially the same manner as the forms of the invention previously described.

A still further modification of the sealing assembly is shown in FIGURE 14 wherein the sealing element 531 is provided with inwardly extending annular lips 535 and 536 at its upper and lower ends respectively. The lip 535 is inwardly reduced or tapered and curves upwardly away from the lower lip 536, and the lower lip 536 is likewise inwardly reduced or tapered and is curved downwardly and away from the upper lip 535. The lip 535 is adapted to engage the lower surface 551 of an upper member 556 and the lower lip 536 is adapted to engage the upper surface 534 of a lower member 533. The upper member 556 and the lower member 533 are movable longitudinally relative to each other on a mandrel 532 to initially mechanically expand the sealing element 531 into sealing engagement with the wall of the tubing T. O-rings 521 and 523 are disposed in internal annular recesses 520 and 522, respectively, formed in the upper member 556 and the lower member 533, respectively. An inwardly and downwardly inclined port 586 is formed in the upper member and extends from the exterior thereof downwardly and inwardly into the surface 551 adjacent the inner reduced portion of the upper lip 535 of the sealing element. A similar port 589 is formed in the lower member 533 and extends inwardly and upwardly from the exterior of the lower member to the surface 534 adjacent the inner reduced portion of the lower lip 536.

It will therefore be seen that fluid pressure from exteriorly of the lower member 533 may pass inwardly through the port 589 and will lift the lower lip 536 off the surface 543 and flow inwardly into the bore 562 of the sealing element 531. The fluid pressure cannot escape past the upper O-ring 521 which seals between the upper element 556 and the mandrel 532, and the upper lip 535 at the upper end of the sealing element 531 closes the port 586 and prevents escape of the pressure from below outwardly through the port 586 to the annular space above the main sealing element 531 so that the sealing element is tightly fluid expanded into sealing engagement with the upper element 556 and the bore of the tubing T. Similarly, if the pressure from above is greater, such pressure will pass inwardly through the upper port 586, lifting the lip 535 off the surface 551 and entering the bore of the main sealing element 531. The pressure cannot move outwardly past the lower O-ring 523 and the lower lip 536 engages the surface 534 to close the port 589 so that the pressure cannot move downwardly and outwardly through the lower port. The pressure therefore acts on the sealing element 531 to further pressure expand the same tight sealing engagement with the wall of the tubing. Thus, the sealing element is initially mechanically expanded, and fluid pressure will further tightly set and hold the sealing element in sealing engagement to prevent flow of fluid past such sealing element in the same manner as the forms of the assembly previously described.

A still further form of the invention is shown in FIGURE 15 wherein the sealing element 631 is disposed between a fixed shoulder 634 on a lower member 633 and a movable upper member 636 movable longitudinally on an upward extension 634 of such lower member. The upper member has an internal annular recess 620 in which a sealing ring 621 is disposed to seal between the upper member and the upward extension 634 of the lower member 633. The sealing element 631 is initially mechanically expanded by relative movement of the upper member 636 toward the shoulder 634 of the lower member 633. Fluid pressure from a source below the lower member 633 may pass upwardly through an internal annular passage 681 between the lower member 633 and the inner mandrel 632 and past a lower U-shaped annular sealing ring 688 disposed in an external annular groove 689 formed in the mandrel 632, then through a lateral port 650 in the bore wall of the upper extension 634 of the lower member communicating with the bore 662 of the sealing element 631. An upper U-shaped sealing ring 685 is disposed in an external annular recess 686 in the mandrel above the lower ring and above the port 650 and prevents the fluid from below in the passage 681 from passing upwardly past such upper sealing ring so that the fluid pressure from below, moving inwardly through the port 650 into the bore 662 of the sealing element 631, further expands the sealing element into tight pressure expanded sealing engagement with the wall of the tubing T. Similarly, fluid pressure from above the upper member 636 may flow downwardly through an internal annular passage 636b between the upward extension 634 of the lower member and the mandrel 632 and downwardly past the upper U-shaped sealing ring 685 to the port 650. Since the lower U-shaped sealing ring 688 prevents fluid from above from moving downwardly therepast, fluid will be directed inwardly through the port 650 to the bore 662 of the sealing element 631 to further fluid pressure expand the same into tight sealing engagement with the wall of the well tubing. Thus, this form of sealing assembly functions to seal in the same manner as the sealing assemblies of the forms earlier described.

Still another form of sealing assembly is shown in FIGURE 16, wherein the main sealing element 731 is disposed between a lower member 733 and an upper member 736 mounted on a mandrel 732 and movable longitudinally relative to each other to initially mechanically expand the sealing element 731 into sealing engagement with the wall of the tubing string T. The bore 762 of the sealing element 731 is sufficiently large to provide an internal annular space 735 between the sealing element and the exterior of the mandrel 732 and a substantially X-shaped sealing ring 750 is disposed within the bore of the sealing element 731 exteriorly of the mandrel and is slidable in the annular space 735 therebetween. Upward movement of the sealing ring 750 is limited by engagement of the sealing ring with the downwardly facing surface 751 of the upper member 736, and downward movement of the sealing ring is limited by engagement thereof with the upwardly facing surface 734 of the lower member 733. An upper O-ring 721 is disposed in an internal annular recess 720 formed in the bore of the upper member and seals between said upper member and the mandrel and a lower O-ring sealing ring 722 is disposed in an internal annular recess 723 formed in the lower member 733 and O-ring seals between the lower member 733 and the mandrel.

A downwardly and inwardly inclined port 786 is formed in the upper member 736 and extends from the exterior thereof downwardly and inwardly to the surface 751 between the main sealing element 731 and the mandrel and to the annular space 735 above the X-shaped movable sealing ring 750, whereby fluid pressure from exteriorly of the upper member 736 may flow inwardly through the port and into the annular space 735 above the sealing ring 750 to move the same downwardly in the annular space into engagement with the upper surface 734 of the lower member 733 to close a lower port 788 formed in the lower member and extending inwardly and upwardly from the exterior of such lower member to the upper surface 734 thereof and communicating with the bore 735 between the main sealing element 731 and the mandrel 732. As the X-shaped sealing ring 750 engages the surface 734 adjacent the upper inner end of the port 788, the port is closed against further fluid flow by the engagement of the lower bifurcated end of the sealing ring with the surface on opposite sides of the port and the fluid pressure is trapped in the annular space 735 thereabove to expand the main sealing element 731 into fluid tight sealing engagement with the tubing string.

Similarly, fluid pressure from below the sealing element may pass upwardly through the port 788 into the annular space 735 below the sealing ring 750 and move the sealing ring upwardly in the annular space into engagement with the lower surface 751 of the upper member 736 on opposite sides of the lower inner end of the upper port 786 to close off flow of fluids outwardly through said upper port and thus trap the pressure of the fluids in the annular space 735 and in the bore 762 of the sealing element 731 to cause the sealing element to be further pressure fluid expanded into tight sealing engagement with the tubing T by fluid pressure from below. Thus, this form of the sealing assembly also functions in substantially the same manner as the forms previously described, to perform substantially the same results.

Figure 17:
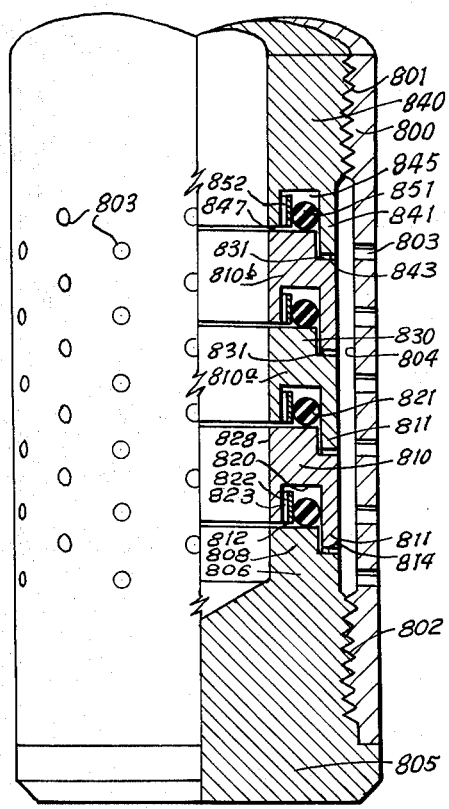
FIGURE 17 is a view of a plurality of seal rings similar to the seal rings of FIGURES 5 through 8, and showing the same mounted on a well tool for controlling flow in one direction through said tool.

In FIGURE 17 is shown a well apparatus having a plurality of the one-way seal O-rings sealing assemblies, such as are shown in FIGURES 5, 6, 7 and 8, incorporated therein to provide for a substantial flow of fluids in one direction but likewise to provide for cutting off flow of fluids in the opposite direction therepast.

The apparatus includes an elongate outer sleeve 800 having internal screw threads 801 in the upper portion of its bore and internal screw threads 802 in the lower portion of its bore. A plurality of lateral apertures 803 are formed in the wall of the sleeve intermediate the threaded portions. A plug 805 is threaded into the lower end of the bore of the sleeve to close such bore. The plug has an upstanding annular flange 806 formed thereon having an external diameter less than the bore 804 of the sleeve 800 whereby an annular space 807 is formed between the flange and the sleeve. The upper portion of the flange is further reduced in diameter to provide an upstanding annular supporting ring 808, and a plurality of spacer rings 810, 810a and 810b, each having a depending flange 811 formed thereon are mounted above this upstanding supporting ring 808 with the ring disposed in a counter bore 812 in the lower portion of the lower ring 810. The ring 810 is shown in perspective view in FIGURE 18, and this view clearly illustrates that the lower portion of the depending flange 811 has a plurality of circumferentially spaced depending feet 813 formed integrally therewith which engage the shoulder 814 formed at the junction of the ring 808 with the upstanding flange 806 of the plug 805 to support the ring on the flange with a plurality of lateral flow passages or spaces 815 formed between the surface 814 and the lower end portion of the depending flange 811 between the feet 813, whereby fluid may flow inwardly or outwardly through such spaces 815 between the feet of the flange 811 and the surface 814 of the flange 806. The bore of the depending flange 811 is greater in diameter than the external diameter of the upstanding annular supporting ring 808 whereby an annular flow passage 816 is provided therebetween, and the length of the flange 811 and the feet 813 thereon is such that the lower annular surface 817 in the counterbore of the spacer ring within the flange 811 is spaced from the upper surface 812 of the annular supporting ring 808 to provide a continuous annular laterally extending passage 818 between the surfaces 812 and 817. Fluid may thus flow through the spaces 815 and the passages 816 and 818 from the exterior to the interior of the spacer ring, and vice versa. An annular sealing ring recess 820 is formed in the lower surface 817 of each of the spacer rings and an O-ring sealing ring 821 is received therein. A fluid passing spacer ring 822 is also received in the recess inwardly of the O-ring 821 and engaging the inner wall 820b of the recess. The O-ring is adapted to seal between the upper surface 812 of the supporting ring 808 and the outer wall 820a of the recess 820 to prevent outward flow of fluid from within the ring outwardly through the annular passage 816 between the depending flange 811 and the upstanding annular supporting ring, and the spaces 815 to the exterior of the supporting ring. The fluid passing spacer ring 822 is provided with a plurality of internal axially extending grooves 823 which provide flow courses between the spacer ring 822 and the inner surface 820b of the recess 820, whereby the fluid passing inwardly from exteriorly of the ring through the spaces 815 and the annular flow passage 816 between the flange 811 and the supporting ring 808 may pass the O-ring 821 and flow inwardly through the flow passage 818 between the inner lower surface 817 of the ring 810 and the upper surface 812 of the supporting ring into the bore 828 of the spacer ring 810, since the O-ring cannot seal against an imperforate or closed surface to prevent flow therepast. The upper end portion of each spacer ring is reduced in external diameter to provide an upstanding annular supporting ring 830 and an annular upwardly facing surface 831 identical to the supporting ring 808 and surface 814 at the upper end of the plug 805, and the ring 810a is adapted to be mounted on the upper end of the ring 810 and to coact therewith in the same manner as the ring 810 coacts with the upstanding supporting ring 808 of the plug. The ring 810a is identical in all respects to the ring 810 and contains an O-ring sealing ring 821 and a fluid passing spacer ring 822 identical to those of the ring 810 mounted in a groove 820 and functioning to control flow of fluids between the rings in the same manner as the ring and plug just described. Any number of the rings 810, 810a, 810b may be provided, depending upon the length of the sleeve 800. An uppermost retaining ring 840 is threaded into the threads 801 at the upper end of the bore of the sleeve 800, and this retaining ring has its lower portion reduced in diameter and formed identical to the lower portion of the spacer ring 810, so as to be provided with a depending annular flange 841 having feet 843 thereon engaging the upwardly facing shoulder 831 of the uppermost ring 810b surrounding the upstanding supporting ring 830 of such uppermost ring. An internal annular recess 845 is formed in the lower inner surface 847 of the retaining ring 840 and this recess receives an O-ring sealing ring 851 and a spacer ring 852 similar to the sealing rings 821 and the spacer rings 822 already described for controlling flow between the depending flange 841 and the upstanding supporting ring 830 of the uppermost ring 810b. The lower inner surface 847 of the counter bore of the retaining ring is spaced from the upper end surface 812 of the ring 810b to provide a flow passage 848 therebetween and fluid may flow inwardly through the passage 845 between the feet 843 at the lower end of the flange 841 of the retaining ring and past the O-ring sealing ring 851 into the bore of the retaining ring, but the O-ring will seal between the outer wall surface 845a of the recess 845 and the upper surface 812 of the spacer ring 810b to prevent outward flow of fluids.

Obviously, any number of the rings 810, 810b, may be provided to accommodate any desired amount of flow inwardly through the openings of the sleeve 800, and the O-rings will permit such inward flow but will prevent outward flow by their sealing engagement with the upper surfaces of the upstanding supporting rings and the depending annular flanges of the several elements. Thus, the O-rings provide a one-way seal permitting inward flow but preventing outward flow through the structure.

Figures 19, 20:
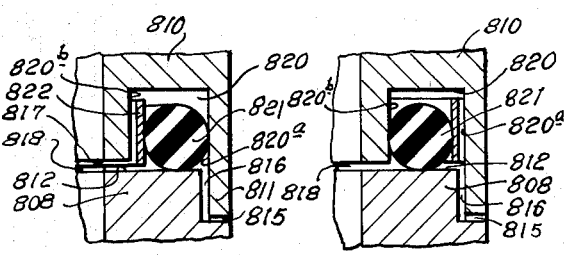
FIGURE 19 is an enlarged fragmentary vertical view of one of the sealing elements of FIGURE 17.
FIGURE 20 is a fragmentary view, similar to FIGURE 19, showing a modified form of spacer ring in a sealing device similar to that of FIGURE 17 for preventing flow in the opposite direction through the device.

FIGURE 19 is an enlarged view of the spacer rings and O-ring sealing members of the device of FIGURE 17, and carries corresponding numbers.

Figure 18:
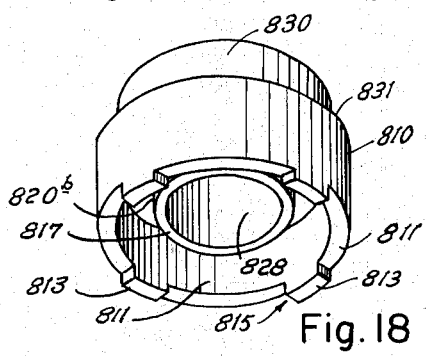
FIGURE 18 is a perspective view of one of the spacer rings of the device of FIGURE 17.

FIGURE 20 is a modification of the device of FIGURES 17 through 19, and shows the O-ring sealing ring 821 mounted in the annular recess 820 formed in the spacer ring member 810. Flow spaces 815 extending inwardly from the exterior of the members into the annular flow passage 816 formed between the supporting ring 808 and the bore of the flange 811 permits fluid to flow into the recess 820 to act on the O-ring 821 to cause the O-ring to seal against the inner wall surface 820b of the recess and surface 812 of the supporting ring 808 to prevent further flow of such fluid into the passage 818 and to the bore of the spacer ring. A flow passing spacer ring 822a having axially extending external grooves or recess 823a formed in its outer surface, is disposed in the recess 820 engaging the outer wall surface 820a which permits fluid pressure from within the bore 828 of the spacer ring 810 to flow outwardly past the O-ring and through the passage 816 and the spaces 815 to the exterior of the ring, since the O-ring cannot effect a seal with the wall 820a of the recess. This form of the device therefore permits outward flow but prevents inward flow.

FIGURES 21 through 24 illustrate a slight modification of the device of FIGURES 17 through 19, and show an O-ring sealing ring 913 disposed in an internal annular recess 901 formed in the bore wall of the depending annular flange 902 of an upper spacer ring member 900. The flange 902 has a plurality of integral circumferentially spaced depending feet 903 which engage the upper surface 904 of a lower spacer ring member 905 to provide a plurality of flow passages or spaces 906 extending inwardly between the lower end of the flange and the surface 904 from the exterior of the spacer ring members into an annular flow passage 907 formed between the bore wall of the depending flange 902 of the upper spacer ring member and an annular projection or neck 908 on the lower spacer ring member extending upwardly from the upper surface 904 of the lower ring member. The inner upper end of the neck is upwardly and inwardly beveled and is spaced from an inwardly and upwardly inclined shoulder 910, defining the upper limit of the bore of the flange 902 and the lower end of the bore 911 of the upwardly projecting neck portion of the spacer ring next above, so that the annular passage 907 is provided with an upward and inward continuation 912 above the O-ring 913 disposed in the internal annular recess 901 of the upper member. A flow passing spacer ring 915 is disposed in the recess 901 above the O-ring sealing ring 913 and prevents the O-ring from sealing against the upper surface 916 of the recess 901. The spacer ring 915 may be formed in the manner shown in FIGURE 22 from an annular ring of flat material having substantially two helical coils overlying each other as shown in FIGURE 22 and having the opposite ends of the coils terminating short of each other whereby a curved space 933 is formed above and a similar curved space 934 is formed below the intermediate portion 935 of the coil flat material. The space 916 in FIGURE 21 corresponds to the upper space 933 in FIGURE 22, and this space permits fluid to flow inwardly from the recess 901 and prevents the O-ring from sealing against the upper wall surface 916 of the recess 901. If desired, a ring similar to the ring 940 shown in FIGURE 23 may be provided instead of the ring 915. The ring 940 has a plurality of radial slots 941 formed in one surface thereof and these slots provide flow spaces between the ring and the surface 916, while the opposite planar surface or side 942 of the spacer is engaged by the O-ring. The fluid may therefore flow from the recess 901 through the passages 941 to the passage 912 to prevent the O-ring from sealing in an upward direction. The O-ring will, however, seal against the outer surface of the neck 908 and the lower wall surface 917 of the recess 901 to prevent flow from the bore of the spacer rings past the O-ring and through the passages 907 and 906 to the exterior of the spacer rings.

Figure 21:
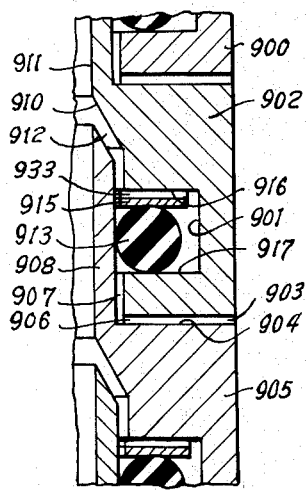
FIGURE 21 is a fragmentary vertical sectional view of a modified form of the device of FIGURE 17.
Figure 24:
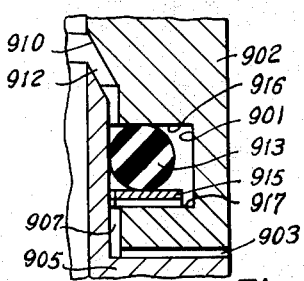
FIGURE 24 is a view similar to FIGURE 21, showing the seal ring assembly arranged to prevent flow in the opposite direction.

FIGURE 24 is identical of FIGURE 21 but shows the flow passing spacer ring disposed below the O-ring sealing ring 913 in such a fashion that the O-ring seals against the exterior of the neck 908 and the upper surface 916 of the recess to prevent inward and upward flow of fluids from the passages 906 and 907 through the passage 912, but permits downward flow through the passage 912 past the O-ring and outwardly through the passage 907 and the passage 906 to the exterior of the spacer ring 900.

From the foregoing it will be seen that a new and improved sealing assembly has been disclosed which is designed to effect a fluid tight seal between adjacent surfaces by means of a mechanically expanded movement of the expansion of the sealing element into initial sealing position, and the subsequent application of fluid pressure thereto to further set and hold the sealing assembly in sealing position to prevent flow of fluids therepast. It will likewise be seen that the sealing assemblies are adapted to prevent flow of fluids under pressure therepast in either direction, acting as a double cup type seal for preventing flow from either side of the sealing assembly. It will also be seen that the sealing assembly includes a sealing element which is adapted to be mechanically expanded into initial sealing engagement with an adjacent surface and which is designed to be maintained thereafter in sealing condition by fluid pressure acting on such sealing element to seal off flow of fluid in either direction past the sealing element.

It will particularly be noted that the sealing element is adapted to be actuated into initial sealing engagement by mechanical compression and that the sealing assembly is so designed that fluid pressures acting on the sealing element from either direction across the sealing assembly will further pressure set the sealing element in sealing position to prevent flow of fluid therepast.

It will also be seen that a new and improved one way sealing ring structure has been provided for permitting flow of fluids in one direction therepast but preventing flow of fluids in the opposite direction, and that a plurality of such sealing ring structures may be incorporated in a single tool to provide for a substantial volume of flow past the sealing ring structures in one direction but to shut off flow therepast in the opposite direction.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A sealing device comprising: an elongate mandrel; an expansible tubular seal element on said mandrel; expanding means on said mandrel engageable with said seal element for compressing said seal element in a longitudinal direction to expand the same in a transverse direction into initial sealing engagement with a surrounding body wall; means on said mandrel limiting the initial mechanical compression of said seal means by said expanding means; conduit means associated with said mandrel and said expanding means for conducting fluid pressure from the exterior of said mandrel inwardly past said expanding means to the interior of said seal means after the same has been initially moved into sealing position to further pressure set said seal member; and means associated with said conduit means for preventing flow of fluid from the interior of said seal member back outwardly through said conduit means.

2. A sealing device comprising: an elongate mandrel; an expansible annular seal element on said mandrel; expanding means on said mandrel engageable with said seal element for compressing said seal element in a longitudinal direction to expand the same in a transverse direction into initial sealing engagement with a surrounding body wall; means on said mandrel limiting the initial mechanical compression of said seal means by said expanding means; conduit means for conducting fluid pressure inwardly past said expanding means to the interior of said seal element to expand the same comprising flow passage means associated with said mandrel and said expanding means for conducting fluid pressure from either end of said sealing element exteriorly of the mandrel inwardly past said expanding means to the interior of the seal element to pressure set said seal element; and means associated with said flow passage means for preventing flow of fluid from the interior of said seal member back outwardly through said flow passage means to the exterior of the mandrel.

3. A sealing assembly for use in a tubular flow conductor comprising: an elongate mandrel; an annular expansible sealing element mounted exteriorly on said mandrel; expander means on said mandrel movable longitudinally relative to said sealing element to engage the opposite ends of said sealing element for expanding said sealing element into sealing engagement with the inner wall of said flow conductor upon such longitudinal movement of said expander means relative to said sealing element; and means on said expander means and said mandrel providing a flow passage for conducting fluid pressure from exteriorly of said mandrel inwardly past said expander means to the interior of said sealing element to further pressure set the sealing element to hold fluid pressure against flow past said sealing element; and means associated with said flow passage for preventing flow of fluids from the interior of said sealing element back outwardly through said flow passage to the exterior of the mandrel.

4. In a well tool to be disposed in a well flow conductor in a well: a mandrel; opposed shoulder means mounted on said mandrel and movable longitudinally with respect to each other; an annular cylindrical, inherently retractable, normally retracted, pliant, elastic sealing element mounted on said mandrel between said shoulder means and having its opposite ends engageable with said shoulder means; said sealing element being movable to expanded position into initial sealing engagement with said well flow conductor upon relative movement of said shoulder means toward each other to initially foreshorten said packing and expand the same into engagement with the well flow conductor; and unidirectional flow conduit means for conducting fluid from exteriorly of the mandrel inwardly past said shoulder means to the bore of said sealing element to further pressure set said sealing element in sealing engagement with said well flow conductor comprising a flow passage between said shoulder means and said mandrel, and means associated with said flow passage preventing reverse flow of fluid outwardly through said flow passage from within said said sealing element.

5. A sealing assembly for a well tool adapted to be lowered in a well flow conductor comprising: a mandrel; longitudinally spaced shoulder means mounted on the mandrel and movable longitudinally with respect to each other; an annular substantially cylindrical seal member mounted on the mandrel between said shoulder means for endwise compression therebetween to laterally expand said sealing element to sealing engagement with the well flow conductor; means on said mandrel and said shoulder means providing a flow passage for conducting fluid pressure from exteriorly of said mandrel past said shoulder means to the bore of said sealing element to further pressure set and hold said sealing element in sealing engagement with said well flow conductor; and means in said flow passage preventing reverse flow of fluid from within said sealing element back outwardly through said flow passage to the exterior thereof.

6. A sealing assembly for a well tool adapted to be lowered in a well flow conductor comprising: a mandrel; longitudinally spaced opposed shoulder means mounted on the mandrel and movable longitudinally with respect to each other; an annular substantially cylindrical inherently retractable, normally retracted, elastic seal member mounted on the mandrel between said shoulder means for endwise compression therebetween upon movement of said shoulder means relatively toward each other to laterally expand said seal member to sealing engagement with the well flow conductor; conduit means on said mandrel and said shoulder means for conducting fluid pressure from exteriorly of said mandrel past said shoulder means to the bore of said seal member to further pressure set and hold said seal member in sealing engagement with said well flow conductor; and means in each of said conduit means for preventing flow of fluids from the interior of said seal member outwardly through said conduit means.

7. A sealing assembly of the character set forth in claim 5, wherein the seal member has formed in the central portion of its bore wall an internal annular recess providing a thinner wall section in such central portion whereby the central portion of said seal member is deformed readily outwardly into sealing engagement with the wall of the well flow conductor.

8. A sealing assembly of the character set forth in claim 6, wherein the seal member has formed in the central portion of its bore wall an internal annular recess providing a thinner wall section in such central portion whereby the central portion of said seal member is deformed readily outwardly into sealing engagement with the wall of the well flow conductor.

9. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; means providing flow passages through said shoulder and through said expander means to the interior of said seal means for conducting fluid pressure from exteriorly of said mandrel inwardly past said shoulder and said expander means to the interior of said seal means to further pressure set said seal means and hold said seal means in sealing engagement with said conductor; and means operatively associated with each flow passage preventing flow of fluid from within said seal means outwardly through said flow passage.

10. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; first unidirectional flow conduit means comprising a first flow passage through said expander means for conducting fluid pressure from exteriorly of said mandrel inwardly past said expander means to the interior of said seal means to further pressure set said seal means in sealing engagement with said flow conductor, and first check valve means associated with said first flow passage preventing reverse flow outwardly from within said seal means through said first flow passage; and second unidirectional flow conduit means comprising a second flow passage past said shoulder on said manderl for conducting fluid pressure from exteriorly of said mandrel inwardly past said shoulder to the interior of said seal means to further pressure set said means in sealing engagement with said flow conductor, and second check valve means associated with said second flow passage preventing reverse flow of fluid from within said seal means outwardly through said second flow passage.

11. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; conduit means providing a flow passage on said mandrel extending from beyond the end of said seal means to the interior of said seal means for conducting fluid pressure from exteriorly of said mandrel inwardly past said shoulder to the interior of said seal means to further pressure set said seal means and hold said seal means in sealing engagement with said conductor; and means in said flow passage of said conduit means for preventing reverse flow of fluids from the interior of said seal means outwardly to the exterior thereof through said flow passage of said conduit means.

12. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; first conduit means through said expander means for conducting fluid pressure from exteriorly of said mandrel inwardly past said expander means to the interior of said seal means to further pressure set said seal means in sealing engagement with said flow conductor; second conduit means on said mandrel for conducting fluid pressure from exteriorly of said mandrel inwardly past said shoulder to the interior of said seal means to further pressure set said seal means in sealing engagement with said flow conductor; and means in each of said conduit means for preventing flow of fluids from the interior of said seal means outwardly to the exterior of said seal means through said conduit means.

13. A sealing device of the character set forth in claim 2 wherein said expansible seal element comprises: an annular resilient sealing member having an internal annular recess in the inner wall of said annular sealing member, and having the bore thereof at the ends of said sealing member beyond the internal recess flared, the outer portions of the opposite end surfaces of said sealing member being inclined convergently outwardly.

14. A sealing device of the character set forth in claim 2 wherein said expansible seal element comprises: an annular cylindrical resilient sealing member having an internal annular recess in the inner wall of said annular sealing member, and having the bore thereof at the opposite ends of said sealing member beyond the internal recess flared, the outer portions of the opposite end surfaces of said sealing member being inclined convergently outwardly; and anti-extrusion means molded in the outer end portions of the sealing member adjacent the point of juncture of each outwardly convergently inclined end surface with the exterior cylindrical surface of the sealing member.

15. A sealing device of the character set forth in claim 22, wherein said conduit means and said one-way seal means comprise: a central member; an annular member surrounding said central member and spaced therefrom to provide an annular flow passage therebetween; means providing an annular shoulder means on one of said members exposed to said annular space between said members; a resilient sealing member disposed on said shoulder means and engageable with the adjacent surface of the other member to prevent flow of fluids through said annular space between said members in one direction; and means in said passage and engaging said sealing means preventing sealing engagement of said sealing means with said shoulder means and the adjacent surface of the other member in the opposite direction.

16. A sealing device of the character set forth in claim 22, wherein said conduit means and said one-way seal means comprise: a central member; an annular member surrounding said central member and spaced therefrom to provide a flow passage therebetween; an annular recess means in one of said members opening to said annular space between said members; an O-ring disposed in said recess and engageable with one wall surface of said member having the recess therein adjacent said annular space between the members and engageable with the adjacent surface of the other member to seal therebetween; and a flow passing member disposed in said recess and engageable with said O-ring preventing sealing engagement with said O-ring with the wall surface of said recess opposite said one wall surface to permit flow of fluids past said O-ring through said annular space between said members.

17. As a subcombination in a sealing device of the character set forth in claim 22, a one-way seal device including: a first member having an annular sealing surface; a second member adjacent said first member and having an annular surface adjacent and spaced from said annular sealing surface of said first member and provided with an annular recess therein alined with the annular sealing surface of said first member; an O-ring sealing member disposed in said annular recess of said second member and engageable with the sealing surface of said first member and one wall of said recess of said second member for sealing therebetween to prevent flow of fluids through said annular space between said members in one direction; and means in said recess and engaging said O-ring sealing means and an opposite wall of said second member for preventing sealing engagement of said O-ring sealing ring with said second member to permit flow of fluids in the opposite direction to said one direction in said annular space between said members.

18. A sealing assembly for a well device adapted to be inserted in a well flow conductor including: a mandrel having an external annular shoulder thereon; an annular substantially cylindrical sealing element mounted on said mandrel and disposed adjacent said shoulder; an expander member on said mandrel movable in a longitudinal direction thereon toward and from said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means laterally to initial sealing engagement with said flow conductor; means on said mandrel for moving said expander means from said first position to said second position; means on said shoulder and said expander means engageable within the opposite ends of the bore of said seal means to space said opposite end portions of said seal means from said mandrel; first conduit means on said shoulder communicating between the exterior of said mandrel at one end of said seal means and the interior of said seal means; second conduit means on said mandrel and said expander means communicating between the exterior of said mandrel at the end of said seal means opposite said first conduit means and the interior of said seal means; and means in each of said conduit means for preventing flow of fluids from the interior of said seal means to the exterior thereof through said conduit means.

19. A sealing assembly for a well device adapted to be inserted in a well flow conductor including: a mandrel having an external annular shoulder thereon; an annular substantially cylindrical laterally imperforate sealing element mounted on said mandrel and disposed adjacent said shoulder; an expander member on said mandrel movable in a longitudinal direction thereon toward and from said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means laterally to initial sealing engagement with said flow conductor; means on said mandrel for moving said expander means from said first position to said second position; means on said shoulder and said expander means engageable within the opposite ends of the bore of said seal means to space said opposite end portions of said seal means from said mandrel; first conduit means on said shoulder communicating between the exterior of said mandrel at one end of said seal means and the interior of said seal means; second conduit means on said mandrel and said expander means communicating between the exterior of said mandrel at the end of said seal means opposite said first conduit means and the interior of said seal means; and means in each of said conduit means preventing flow of fluids from the interior of said seal means to the exterior thereof through said conduit means.

20. A sealing assembly for a well device adapted to be inserted in a well flow conductor including: a mandrel having an external annular shoulder thereon; an annular substantially cylindrical sealing element mounted on said mandrel and disposed adjacent said shoulder; an expander member on said mandrel movable in a longitudinal direction thereon toward and from said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means laterally to initial sealing engagement with said flow conductor; means on said mandrel for moving said expander means from said first position to said second position; co-operating means on said mandrel and said means for moving said expander means coengageable to releasably retain said expander means in said second position on said mandrel to hold said seal means in position to deform said seal means to initial sealing engagement with said well flow conductor; means on said shoulder and said expander means engageable within the opposite ends of the bore of said seal means to space said opposite end portions of said seal means from said mandrel; first conduit means on said shoulder communicating between the exterior of said mandrel at one end of said seal means and the interior of said seal means; second conduit means on said mandrel and said expander means communicating between the exterior of said mandrel at the end of said seal means opposite said first conduit means and the interior of said seal means; and means in each of said conduit means for preventing flow of fluids from the interior of said seal means to the exterior thereof through said conduit means.

21. A sealing device for use in a flow conductor comprising: a mandrel; means providing a pair of longitudinally spaced external annular shoulders on said mandrel facing each other; a resilient annular member surrounding said mandrel between said shoulders, said annular member and said mandrel having a space therebetween intermediate the ends of said annular member; and means on said mandrel providing flow passage means from beyond the ends of said resilient member to the interior thereof for conducting fluids from exteriorly of said mandrel beyond the ends of said resilient annular member inwardly past said shoulders into the space between said annular member and said mandrel for deforming said annular member by fluid pressure outwardly into engagement with the flow conductor; and means associated with said flow passage means preventing reverse flow of fluids back through said flow passage means from within said resilient member to the exterior of said mandrel.

22. A sealing device for use in a flow conductor comprising: a mandrel; means providing a pair of longitudinally spaced external annular shoulders on said mandrel facing each other; a resilient annular member surrounding said mandrel between said shoulders, said annular member and said mandrel having a space therebetween intermediate the ends of said annular member; conduit means on said mandrel providing a flow course from exteriorly of said mandrel inwardly from beyond one end of said annular member past the adjacent one of said shoulders to the space between said annular member and said mandrel; and one-way seal means in said flow course permitting inward flow of fluid pressure from exteriorly of said mandrel through said flow course of said conduit means past said shoulder into the space between said annular member and said mandrel for deforming said annular member outwardly into engagement with the flow conductor, said one-way seal means in said flow course preventing reverse flow of fluid pressure from within said annular member back through said flow course of said conduit means outwardly to the exterior of said mandrel.

23. A sealing device of the character set forth in claim 21, wherein said means providing one direction flow of fluids from exteriorly of said mandrel past said shoulders into the space between the annular member and said mandrel comprises: a flow passage between said means providing said annular shoulders and said mandrel; means providing internal annular shoulder means in said means providing said external annular shoulders on said mandrel and exposed to said passage between said mandrel and said means providing said external shoulders; a resilient sealing member disposed to engage said internal shoulder means and the adjacent surface of the mandrel to prevent flow of fluids in one direction through said passage between said mandrel and said means providing said annular shoulders; and means in said passage and engaging said sealing means preventing sealing engagement of said sealing means with said shoulder means and the adjacent surface of the mandrel to permit flow through said passage in the opposite direction.

24. A sealing device comprising: an elongate mandrel; an expansible seal element on said mandrel; shoulder means on said mandrel engageable with said seal element for compressing said seal element in a longitudinal direction to expand the same in a transverse direction into initial sealing engagement with a surrounding body wall; means on said mandrel limiting the initial mechanical compression of said seal means by said shoulder means; conduit means on said mandrel providing flow passages from beyond the ends of said expansible seal element to the interior thereof for conducting fluid pressure from the exterior of said mandrel past said shoulder means to the bore of said seal means after the same has been initially moved into sealing position to further pressure set said seal member; and one-way seal means in each of said flow passage of said conduit means for admitting flow of fluid pressure from the exterior of the mandrel to said seal means through said conduit means and preventing back flow of fluids through said flow passages from within the seal member to the exterior of the mandrel.

25. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; first conduit means for conducting fluid pressure from exteriorly of said mandrel past said expander means to the interior of said seal means to further pressure set said seal means in sealing engagement with said flow conductor; second conduit means for conducting fluid pressure from exteriorly of said mandrel past said shoulder to the interior of said seal means to further pressure set said means in sealing engagement with said flow conductor; one-way seal means in said first conduit means permitting flow through said conduit means to the interior of said seal means and preventing back flow outwardly through said conduit means; and one-way seal means in said second conduit means permitting flow inwardly through said conduit means to said seal means and preventing back flow outwardly through said conduit means to the exterior of said mandrel.

26. A sealing assembly for use in a tubular flow conductor comprising: an elongate mandrel; an annular expansible sealing element mounted exteriorly on said mandrel; expander means on said mandrel movable longitudinally relative to said sealing element to engage the opposite ends of said sealing element for distorting said sealing element into sealing engagement with the flow conductor upon longitudinal movement of said expander means relative to said sealing element; conduit means between said expander means and said mandrel for conducting fluid pressure from exteriorly of said mandrel inwardly past said expander means to the interior of said sealing element to further pressure set the sealing element to hold fluid pressure against flow past said sealing element; internal annular groove means in said expander means communicating with said conduit means; annular seal means in said annular groove means engaging said mandrel and said expander means for closing said conduit to prevent flow from the interior of said seal element to the exterior thereof through said conduit means; and means in said recess and engageable with said seal means for preventing sealing action of said seal means to permit flow inwardly of said conduit from the exterior of the mandrel to the interior of the sealing element.

27. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; and unidirectional flow conduit means for conducting fluid pressure from exteriorly of said mandrel inwardly past said expander means to the interior of said seal means to further pressure set said seal means and hold said seal means in sealing engagement with said conductor, seaid unidirectional conduit means comprising flow passages from beyond the ends of said expansible seal member inwardly on said mandrel to the interior of said seal means, and valve means in said flow passages permitting inward flow of fluids through said flow passages into the interior of said seal means and preventing flow of fluids from within the seal means outwardly through said flow passages to the exterior of the mandrel.

28. A sealing device for use in a flow conductor comprising: a mandrel having an external annular shoulder thereon; expansible seal means on said mandrel and disposed adjacent said shoulder; expander means on said mandrel movable in a longitudinal direction on said mandrel with relation to said shoulder for compressing said seal means against said shoulder to deform said seal means laterally relative to said mandrel, said expander means being movable on said mandrel between a first position wherein said seal means is in a normally relaxed condition surrounding said mandrel between said shoulder and said expander means and a second position on said mandrel nearer said shoulder wherein said expander means compresses said seal means against said shoulder to deform said seal means to initial sealing engagement with the flow conductor; means on said mandrel for moving said expander means from said first position to said second position; first conduit means on said mandrel for conducting fluid pressure from exteriorly of said mandrel beyond one end of said seal means inwardly past said expander means to the interior of said seal means to further pressure set said seal means in sealing engagement with said flow conductor; and second conduit means on said mandrel for conducting fluid pressure from exteriorly of said mandrel beyond the other end of said seal means inwardly past said shoulder to the interior of said seal means to further pressure set said seal means in sealing engagement with said flow conductor; and means in each of said conduit means preventing flow of fluid pressure entering the interior of said seal means through the other conduit means from flowing outwardly through said conduit means.

29. A sealing device of the character set forth in claim 21, wherein said means associated with said flow passage means for preventing reverse flow of fluid outwardly through the flow passage means comprises means integral with said seal member for closing said flow passage.

References Cited by the Examiner
UNITED STATES PATENTS

| | | | |
|---|---|---|---|
| 1,905,822 | 4/1933 | Dunn | 277—206 |
| 1,909,663 | 5/1933 | Crickmer | 277—235 |
| 1,925,015 | 8/1933 | Wells | 166—183 |
| 1,984,806 | 12/1934 | Pfefferle | 277—235 |
| 2,006,901 | 7/1935 | Maller | 277—28 |
| 2,182,251 | 12/1939 | Crickner et al. | 166—201 |
| 2,196,668 | 4/1940 | Ragan | 166—201 |
| 2,287,205 | 6/1942 | Stone | 277—28 |
| 2,614,793 | 10/1952 | Storm | 137—525 |
| 2,742,968 | 4/1956 | Heldebrandt | 166—183 |
| 2,743,899 | 5/1956 | Kinney | 137—525 |
| 2,986,217 | 5/1961 | Johnston | 166—196 |
| 2,988,148 | 6/1961 | Conrad et al. | 166—187 |
| 3,036,639 | 5/1962 | Baker | 166—201 |

LAVERNE D. GEIGER, *Primary Examiner.*

SAMUEL ROTHBERG, *Examiner.*